US011866254B2

(12) United States Patent
Reischl

(10) Patent No.: US 11,866,254 B2
(45) Date of Patent: Jan. 9, 2024

(54) OVERHEAD CONVEYING SYSTEM AND METHOD FOR DETERMINING THE THICKNESS OF A HANGING BAG

(71) Applicant: TGW Mechanics GmbH, Wels (AT)

(72) Inventor: Josef Reischl, Gunskirchen (AT)

(73) Assignee: TGW Mechanics GmbH, Wels (AT)

( * ) Notice: Subject to any disclaimer, the term of this patent is extended or adjusted under 35 U.S.C. 154(b) by 191 days.

(21) Appl. No.: 17/611,302

(22) PCT Filed: May 20, 2020

(86) PCT No.: PCT/AT2020/060207
§ 371 (c)(1),
(2) Date: Nov. 22, 2021

(87) PCT Pub. No.: WO2020/232496
PCT Pub. Date: Nov. 26, 2020

(65) Prior Publication Data
US 2022/0242665 A1    Aug. 4, 2022

(30) Foreign Application Priority Data
May 22, 2019   (AT) .............................. A 50471/2019

(51) Int. Cl.
*B65G 17/32*    (2006.01)
*B65G 1/04*    (2006.01)
(Continued)

(52) U.S. Cl.
CPC .......... *B65G 1/0457* (2013.01); *B65G 17/32* (2013.01); *B65G 17/485* (2013.01); *B65G 43/00* (2013.01);
(Continued)

(58) Field of Classification Search
CPC .... B65G 1/0457; B65G 17/32; B65G 17/485; B65G 43/00; B65G 47/61;
(Continued)

(56) References Cited

U.S. PATENT DOCUMENTS 8,490,774 B2 * 7/2013 Janzen ................... B65G 9/002
53/251
9,187,253 B2   11/2015 Olivieri et al.
(Continued)

FOREIGN PATENT DOCUMENTS

AT         521961 A4    7/2020
CA        3127650 A1    7/2020
(Continued)

OTHER PUBLICATIONS

International Search Report in PCT/AT2020/060207, dated Oct. 16, 2020.
Chinese Search Report in CN2020800371984 dated Oct. 26, 2022.

*Primary Examiner* — Leslie A Nicholson, III
(74) *Attorney, Agent, or Firm* — Collard & Roe, P.C.

(57) ABSTRACT

The invention relates to an overhead conveyor system (1a . . . 1d) with hanging bags (2, 2a . . . 2d), which are adjustable between a transport position and a loading position and which are designed for transporting articles (4, 4a . . . 4i), with a loading station (5a . . . 5d), at which a hanging bag (2, 2a . . . 2d) can be loaded with an article (4, 4a . . . 4i), and with an overhead conveying device (6, 6a . . . 6d) for transporting a hanging bag (2, 2a . . . 2d) into the loading station (5a . . . 5d) and for transporting the hanging bag (2, 2a . . . 2d) out of the loading station (5a . . . 5d). The overhead conveyor system (1a . . . 1d) further comprises a measuring device (11a . . . 11d), by means of which an expansion (a) of the bag body (3) in a transport direction of the loaded hanging bag (2, 2a . . . 2d) is determined in the transport position of the bag body (3). Moreover, the inven- (Continued)

tion relates to a method for operating such an overhead conveyor system (1a ... 1d).

17 Claims, 7 Drawing Sheets

(51) Int. Cl.
    *B65G 17/48*     (2006.01)
    *B65G 43/00*     (2006.01)
    *B65G 47/61*     (2006.01)
    *G01B 11/16*     (2006.01)

(52) U.S. Cl.
    CPC .............. *B65G 47/61* (2013.01); *G01B 11/16* (2013.01); *G01B 11/167* (2013.01); *B65G 2203/0208* (2013.01); *B65G 2203/041* (2013.01)

(58) Field of Classification Search
    CPC ...... B65G 2203/0208; B65G 2203/041; G01B 11/16; G01B 11/167
    USPC .............................................. 198/340, 367.11
    See application file for complete search history.

(56) References Cited

U.S. PATENT DOCUMENTS

| | | | |
|---|---|---|---|
| 9,909,252 B2 | 3/2018 | Bringewatt et al. | |
| 10,494,196 B2 | 12/2019 | Fenile | |
| 10,532,841 B2* | 1/2020 | Yamagata | B65G 47/61 |
| 10,737,889 B2* | 8/2020 | Eisenberg | B65B 43/30 |
| 10,781,059 B2* | 9/2020 | Morino | B65G 47/244 |
| 11,046,531 B2 | 6/2021 | Keller et al. | |
| 11,352,216 B2* | 6/2022 | Reischl | B65G 19/025 |
| 11,434,084 B2* | 9/2022 | Ramseier | B65G 47/61 |
| 11,465,847 B2 | 10/2022 | Sutter | |
| 11,649,117 B2* | 5/2023 | Durtschi | B65G 47/38 198/340 |
| 2012/0037272 A1 | 2/2012 | Wend et al. | |
| 2013/0264171 A1 | 10/2013 | Wend et al. | |
| 2014/0284179 A1* | 9/2014 | Janzen | B65G 9/002 198/703 |
| 2019/0291968 A1 | 9/2019 | Gallati et al. | |
| 2019/0367277 A1 | 12/2019 | Sigrist | |
| 2020/0024074 A1 | 1/2020 | Herzog-Lang et al. | |
| 2020/0176433 A1 | 6/2020 | Mueller et al. | |
| 2021/0176433 A1 | 6/2021 | Durtsch | |
| 2021/0403234 A1* | 12/2021 | Altwegg | B65G 17/485 |

FOREIGN PATENT DOCUMENTS

| | | | | |
|---|---|---|---|---|
| CN | 108602626 A | 9/2018 | | |
| DE | 29906532 U1 | 8/1999 | | |
| DE | 20218115 U1 | 4/2004 | | |
| DE | 10 2004 018 569 A1 | 11/2005 | | |
| DE | 10 2012 018 925 A1 | 3/2014 | | |
| DE | 102017201919 A1 * | 8/2018 | ............ | B65G 17/20 |
| EP | 3 147 405 A1 | 3/2017 | | |
| EP | 3 293 130 A1 | 3/2018 | | |
| EP | 3 543 181 A1 | 9/2019 | | |
| EP | 2885231 B1 | 11/2019 | | |
| EP | 3 575 243 A1 | 12/2019 | | |
| JP | 2014-188377 A | 10/2014 | | |
| WO | 2014044601 A1 | 3/2014 | | |
| WO | 2018/130712 A2 | 7/2018 | | |
| WO | 2018162123 A1 | 9/2018 | | |
| WO | 2020/003180 A1 | 1/2020 | | |
| WO | 2020/089177 A1 | 5/2020 | | |

* cited by examiner

OVERHEAD CONVEYING SYSTEM AND METHOD FOR DETERMINING THE THICKNESS OF A HANGING BAG

CROSS REFERENCE TO RELATED APPLICATIONS

This application is the National Stage of PCT/AT2020/060207 filed on May 20, 2020, which claims priority under 35 U.S.C. § 119 of Austrian Application No. A 50471/2019 filed on May 22, 2019, the disclosure of which is incorporated by reference. The international application under PCT article 21(2) was not published in English.

BACKGROUND OF THE INVENTION

1. Field of the Invention

The invention relates to an overhead conveyor system having hanging bags, which each comprise a bag body which is adjustable between a transport position and a loading position and which are made of a non-rigid material and are designed for transporting articles. Moreover, the overhead conveyor system comprises a loading station, at which a hanging bag may be loaded with an article when the bag body is in the loading position. Lastly, the overhead conveyor system comprises an overhead conveying device for transporting a hanging bag into the loading station and for transporting the hanging bag out of the loading station.

The invention also relates to a method in which the hanging bag is provided on an overhead conveying device which is comprised by the overhead conveyor system, the bag body is adjusted into a loading position if it is not already located in the loading position, the hanging bag is loaded with an article and the bag body is adjusted into a transport position after loading.

2. Description of the Related Art

Such an overhead conveyor system and such a method are in general known from the prior art. Hanging bags are loaded with different articles and, subsequently, stored, transported, sorted, picked, and so on, in a storage and order-picking system depending on requirements. The dimensions of the individual hanging bags partly differ considerably from one another and depend on the type of article loaded into the hanging bag as well as on the orientation of the article in the hanging bag. This means that even hanging bags loaded with the same articles may differentiate strongly in terms of their dimensions. This primarily or exclusively relates to the expansion of the bag body in a transport direction of the hanging bag.

The algorithms running in a known overhead conveyor system are based on assumed dimensions of the hanging bags, for example on a mean value. Thus, planning in an overhead conveyor system may be performed merely with a moderate preciseness and the likelihood of malfunctions which are based on wrong assumptions regarding the dimensions of the hanging bags is significant.

SUMMARY OF THE INVENTION

Thus, it is an object of the present invention to indicate an improved overhead conveyor system and an improved method for operating an overhead conveyor system. In particular, the planning of the processes taking place in an overhead conveyor system are to be improved and the risk of malfunctions is to be reduced.

This object is achieved with an overhead conveyor system of the initially mentioned type, which additionally comprises a measuring device designed to determine an expansion of the bag body in a transport direction of the loaded (and hanging) hanging bag in the transport position of the bag body (this means after loading of the hanging bag and adjusting the bag body into the transport position). In other words, the thickness of the bag body is measured. Below, the terms "expansion" of the bag body in a transport direction of the hanging bag and "thickness" of the bag body will be used synonymously.

The object of the invention is further achieved with a storage and order-picking system comprising an overhead conveyor system of the aforementioned type as well as a hanging bag storage connected, in respect of a conveying stream (meaning that the transport bags can be transported from the hanging bag storage to the loading station), to the loading station via the overhead conveying device. A hanging bag storage in general serves for storing and/or receiving a plurality of hanging bags. The hanging bag storage may, in particular, also be operated as a buffer (short-term storage).

The mentioned object is also achieved with a method of the initially mentioned type in which an expansion of the bag body in a transport direction of the loaded (and hanging) hanging bag in the transport position of the bag body (this means after loading of the hanging bag and adjusting the bag body into the transport position) is determined with the aid of a measuring device. In other words, the thickness of the bag body is measured.

By the suggested measures, it is possible to perform the algorithms running in an overhead conveyor system and, in particular, the algorithms running in an overhead conveyor system of a storage and order-picking system based on the actual dimensions of a hanging bag instead of reverting to assumed dimensions which usually do not correspond with the facts. The planning in an overhead conveyor system and/or in an overhead conveyor system of a storage and order-picking system may thus be performed more precisely, and the likelihood of malfunctions may hence be reduced significantly.

In particular, a determined thickness of the bag body may be used for calculating a receiving capacity in a hanging bag storage or in a hanging bag buffer. For example, it may be checked whether a hanging bag with a known thickness or how many hanging bags with a known thickness fit onto an overhead track of a hanging bag storage/hanging bag buffer with a known length. In this regard, in particular, a remaining free length of an overhead conveying device (overhead track) may be made reference to when it is partially occupied with hanging bags. At this point, it should be noted that hanging articles (without hanging bags) may also be stored/buffered in the hanging bag storage/hanging bag buffer additionally to the hanging bags. Accordingly, the hanging bag storage may also assume the function of a hanging article storage and the hanging bag buffer may also assume the function of a hanging article buffer.

For example, it is also possible to store, in a database, a determined thickness of the bag body assigned to the corresponding hanging bag and/or assigned to an article type of the article loaded in the hanging bag. Accordingly, in addition to the already existing data such as length, width, thickness, etc., data on the thickness of the bag body, which is captured after the automatic/manual loading of a hanging bag, is linked in terms of data technology for each article. It is also possible that the hanging bag and/or a transport carrier on which the hanging bag hangs is equipped with an identifying means, in particular an RFID transponder. The identifying means can store the data on the thickness of the bag body which is captured after the automatic/manual loading of a hanging bag. This stored information may be used subsequently for controlling the material flow. However, the data on the thickness may also be stored in the material flow controller and be assigned to a respective transport carrier ID number (identification number).

The overhead conveyor system comprises the overhead conveying device and hanging bags transported therewith. The overhead conveying device is either designed as a stationary overhead conveying device or as a mobile overhead conveying device. The latter may comprise mobile conveying vehicles (a so-called "autonomous guided vehicle—AGV" or an "autonomous mobile robot—AMR") by means of which the hanging bags are transported. At this point, it should be noted that hanging articles (without hanging bags) may also be transported by means of the overhead conveying device additionally to the hanging bags.

The bag body is the part of the hanging bag in which the article is received. Usually, the bag body consists of a non-rigid material, such as a textile, a plastic film, a mesh or a knitted fabric.

The hanging bags may each comprise a bag body adjustable between a transport position and a loading position, said bag body forming a rear wall and a front wall, wherein the rear wall and the front wall are held being approximated to one another in the transport position such that the loaded hanging bag can be transported with the article. In the loading position of the hanging bag, the rear wall and the front wall are spaced apart from one another by such a distance that the hanging bag can be loaded with an article. When the hanging bag is loaded, an article is held (in particular clampingly held) between the rear wall and the front wall in the transport position of the hanging bag. When the hanging bag is unloaded and/or empty, the rear wall and the front wall abut on one another in the transport position of the hanging bag.

In particular, the bag body may comprise
a front wall and a rear wall of non-rigid material,
a loading opening formed on a first side of the bag body at least in some sections between the front and rear wall, and
a side wall stop which is formed on a second side of the bag body at least in some sections between the front and rear wall and against which the article can be placed.

The bag body is the part of the hanging bag which is measured by the measuring device. The measurement can be performed during productive operation or in a separate measurement step, independent of productive operation.

Exemplary embodiments of a hanging bag are described in Austrian patent application A50059/2019 and are made the subject matter of the present disclosure.

A loading station is a work station at which a hanging bag is loaded. For this purpose, the loading station comprises an overhead conveying device by means of which the (unloaded) hanging bags are supplied and the (loaded) hanging bags are transported away. For the loading process, the hanging bag can be stopped at a loading location, but it is also conceivable that the hanging bag is moved continuously during loading by the overhead conveying device. The loading station can be designed for a manual loading of the hanging bags or for an automatic loading of the hanging bags. If automatic loading takes place, the loading station comprises a loading device or a loading robot, which may be formed in particular by a jointed-arm robot or a gantry robot. In general, it is advantageous for the hanging bags to be each loaded with a single article.

In the loading station, the bag body can be adjusted from a transport position into a loading position and vice versa. It is favorable for the loading station to comprise an actuation device for this purpose by means of which the bag body can be adjusted from the transport position into the loading position and from the loading position into the transport position. Hence, the loading operation may be partially or entirely automated.

During the transport movement of the hanging bag along the overhead conveying device, the bag body may be adjusted (i.e. opened) from the transport position into the loading position. For example, a frame of the hanging bag may slide along a guide track of an actuation device and effect the adjustment from the transport position into the loading position. Such a design for a loading station is described in DE 10 2004 018 569 A1. Alternatively, the hanging bag is temporarily transported to the loading location and stopped at the loading location, whereupon the bag body can be adjusted (i.e. opened) from the transport position into the loading position by means of an actuation device, for example by a swivel frame or a loading robot. Such a design for a loading station is described in WO 2018/130712 A2 or EP 3 293 130 A1.

After loading of the hanging bag, the bag body is adjusted out of the loading position into the transport position. Hence, during the transport movement of the hanging bag along the overhead conveying device, the bag body may be adjusted (i.e. closed) from the loading position into the transport position. For example, a frame of the hanging bag may slide along a guide track of the actuation device and effect the adjustment from the loading position into the transport position. Such a design for a loading station is described in DE 10 2004 018 569 A1. Alternatively, the bag body is adjusted (i.e. closed) from the loading position into the transport position by means of an actuation device, for example a swivel frame or a loading robot, and the hanging bag is transported away from the loading location only afterwards. Such a design for a loading station is described in WO 2018/130712 A2 or EP 3 293 130 A1.

Although the adjustment of the bag body between the transport position and the loading position is carried out automatically in a preferred embodiment, it may also be carried out manually. For example, a hanging bag may be provided at a loading location in the loading station, and an operator may swivel a frame of said hanging bag such that the bag body is adjusted from the transport position into the loading position. As soon as the operator releases the frame, the bag body moves from the loading position into the transport position.

The adjustment of the bag body from the loading position into the transport position or from the transport position into the loading position may thus in general be carried out manually or automatically.

The provision of the hanging bag may comprise the supply of the hanging bag to a loading location or the suspension of the hanging bag at a loading location.

Further advantageous designs and further advancements of the invention result from the subclaims as well as from the description in combination with the figures.

It is favorable for the measuring device to be arranged in the loading station. Hence, the measurement results concerning the expansion of the bag body are available immediately after loading of the hanging bags.

However, it is also favorable for the measuring device to be arranged along a conveying section of the overhead conveying device arranged outside the loading station. Hence, the measurement results regarding the expansion of the bag body can be determined at the time they are actually required, for example in front of a warehouse or a buffer. This also takes into account displacements of the article in the hanging bag that occur during transport of the hanging bag on the overhead conveyor system after the loading station.

Of course, multiple measuring devices can be provided along the overhead conveying device in order to be able to determine the expansion of the bag body more than once. In particular, measuring devices may be provided both in the loading station and outside the loading station.

It is favorable if the hanging bag comprises a suspended support for the suspended transport of the hanging bag on the overhead conveying device and a frame by means of which the bag body is suspended on the suspended support and by which the bag body can be adjusted between the transport position and the loading position. By the frame, the bag body, which is per se non-rigid, is held in an at least partially predefined shape in both the loading position and the transport position. Hence, on the one hand, the loading operation is facilitated and, on the other hand, a change in the shape of the bag body during transport across the overhead conveying device is less likely.

Moreover, it is favorable if the overhead conveying device comprises transport carriers for transporting the hanging bags into the loading station and for transporting them out of the loading station, which transport carriers are movable by a drive device and on which the hanging bags are suspended via the suspended support. In general, the bag body may be suspended with its ends on one or two transport carriers on an overhead conveying device. When the bag body is suspended with its ends on two transport carriers on an overhead conveying device, an adjustment from the transport position into the loading position is possible for example by the distance between the two transport carriers being enlarged. For the adjustment from the loading position into the transport position, the distance between the two transport carriers is, in turn, correspondingly reduced.

In a particularly preferred embodiment of the overhead conveyor system, a swing-calming device, which comprises a broom or brush bar and is arranged in the range of motion of the hanging bag, is provided. Hence, a swinging motion of the hanging bag, which is unfavorable to the determination of the expansion of the bag body, quickly reduces. The measurement of the expansion of the bag body may thus be carried out quickly and with a high accuracy. In this regard, the bristles of the broom or brush bar which touch a hanging bag (in particular its bag body) generally have multiple effects. On the one hand, as mentioned, they ensure a rapid reduction of a swinging motion, on the other hand, they also ensure an alignment of the hanging bag, but at the same time they also enable a trouble-free transport of the hanging bags in the area of the broom or brush bar. The broom or brush bar may be arranged in the lower movement range of the hanging bag, in particular at a lower edge of the bag body, or in the lateral movement range of the hanging bag, in particular at a side edge of the bag body. It is also possible to arrange multiple broom or brush bars in the movement range, in particular in the lower and lateral movement ranges. Hence, the aforementioned advantages stand out particularly.

In a further particularly preferred embodiment of the overhead conveyor system, a positioning device arranged in the movement range of the hanging bag is provided, said positioning device comprising a wall aligned transversely (in particular at a right angle) to the transport direction of the hanging bag. Hence, a swinging motion of the hanging bag, which is unfavorable to the determination of the expansion of the bag body, can also be quickly reduced or prevented overall. The measurement of the expansion of the bag body may thus also be carried out quickly and with a high accuracy. The mentioned wall also, on the one hand, ensures a quick reduction or prevention of a swinging motion; however, on the other hand also in particular ensures an alignment of the hanging bag. To prepare the measurement, the hanging bag (in particular its bag body) is driven against the wall aligned transversely to the transport direction, whereby the hanging bag assumes the orientation of the mentioned wall. The wall may be designed as a fixed wall or as a movable wall. If the wall is movable, it may be adjusted, in particular pivoted and/or pushed, into the movement range of the hanging bags as needed. If the wall is fixed, the transport direction of the hanging bags is changed in order to move them to and from the wall.

Additionally, it is advantageous if the measuring device is designed as a camera or a light grid (which corresponds to an arrangement of multiple light barriers with light rays arranged in a grid). The measuring device may comprise optoelectronic sensors, by means of which the expansion of the bag body can be detected in a contactless manner, for example by means of a CCD camera (charge coupled device). Accordingly, tried and easily available means are used for the aforementioned purpose. A particular advantage of the camera is that it not only allows determining the expansion of the bag body but also detecting other properties. For example, using the camera, an article type of the article loaded in the hanging bag, the number of articles loaded in the hanging bag, and the orientation of the article loaded in the hanging bag can be determined. By using a light grid, particularly convex shapes of the bag body can be measured with great accuracy.

It is favorable if the expansion of the bag body is measured when the hanging bag is at a standstill. Thereby, the result is independent of the time needed for measuring. This embodiment variant is particularly suitable for the application in combination with a camera, which acts as the measuring device.

However, it is also favorable if the expansion of the bag body is measured while the hanging bag is transported on the overhead conveying device (meaning that the measuring takes place in motion). Thereby, a measurement of the thickness of the bag body can take place in particular with a static measuring device, for example a fixedly-installed light grid.

In a particularly advantageous embodiment variant of the suggested method, an (optical and/or acoustic) output unit, which is comprised by the loading station, is used to output an instruction to an operator in the loading station or to a loading robot of the loading station, to place the article loaded in the hanging bag differently (in particular in a predefined orientation) in the hanging bag if the determined expansion/thickness of the bag body exceeds a reference value. The instruction for the operator may be an image output, audio output and/or speech output. The instruction for the loading robot in the loading station is to be understood to the effect that it contains control signals by means of which an automated repositioning of the article in the hanging bag takes place and/or the hanging bag is loaded with an article, which has been previously oriented accordingly by the loading robot.

In this embodiment variant, it is thus assumed that the article is placed in the hanging bag in a predefined orientation. In the case of manual loading, this instruction may take place actively, for example by means of a corresponding depiction on a screen in the loading station, or by having the operator at the loading station be trained accordingly. If the loading takes place automatically, a corresponding instruction may be issued to the loading robot. A particular problem when loading hanging bags is based on the fact that the expansion/thickness does not necessarily correspond to an expected value or reference value, even if the article is placed in the hanging bag correctly, i.e. according to the instruction. The reason for this is that the orientation of the article may change in an unexpected and undesired manner when the hanging bag is closed, that is upon adjustment from the loading position to the transport position, and/or during the transport of the hanging bag on the overhead conveying device. However, with the suggested measures, a check and an appropriate correction is possible. The instruction to the operator in the loading station or to the loading robot of the loading station may, in this regard, particularly comprise information as to the orientation in which to place the article in the hanging bag, for example in the case of manual loading by using graphic depictions on a screen in the loading station. However, it is also conceivable that the mentioned instruction does not contain any such information. This is sufficient, particularly when the desired orientation is already known to the operator in the loading station or the loading robot of the loading station. When loading manually, the activation of a signal light or the output of a signal tone essentially suffices for manual loading.

It is also particularly advantageous if an (optical or acoustic) output unit, which is comprised by the loading station, is used to output an instruction to an operator in the loading station or to a loading robot of the loading station, to place the article loaded in the hanging bag differently (in particular in a predefined orientation) in the hanging if a determined orientation of an article placed in the hanging bag deviates from a reference orientation beyond a threshold value. The possibilities suggested for this purpose and the advantages resulting therefrom are equivalent to the aforementioned embodiment variants and advantages. However, the expansion/thickness of the bag body is not compared to a reference value in order to determine an undesired orientation of the article in the bag body, but the orientation of the article is compared directly to a reference orientation, for example with the aid of a camera. In this embodiment variant, it is thus again assumed that the article is placed in the hanging bag in a predefined orientation. In the case of manual loading, this instruction may take place actively, for example by means of a corresponding depiction on a screen in the loading station, or by having the operator at the loading station be trained accordingly. If the loading takes place automatically, a corresponding instruction may be issued to the loading robot. A particular advantage of the suggested method is that an undesired orientation of the article in the hanging bag can be determined even before the bag body is adjusted into the transport position. If the actual orientation of the article in the hanging bag does not correspond with the expected orientation, the instruction to the operator in the loading station or to the loading robot of the loading station may again particularly comprise information as to the orientation in which to place the article in the hanging bag, for example in the case of manual loading by using depictions on a screen in the loading station. However, it is also conceivable that the mentioned instruction does not contain any such information. This is sufficient, particularly when the desired orientation is already known to the operator in the loading station or the loading robot of the loading station. When loading manually, the activation of a signal light or the output of a signal tone essentially suffices for manual loading.

At this point, it should be noted that the variants and advantages disclosed for the presented overhead conveyor system and/or for the storage and order-picking system can likewise refer to the presented method and vice versa.

BRIEF DESCRIPTION OF THE DRAWINGS

For the purpose of better understanding of the invention, it will be elucidated in more detail by means of the figures below.

These show in a respectively very simplified schematic representation.

DETAILED DESCRIPTION OF THE PREFERRED EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, are to be analogously transferred to the new position.

Figure 1:
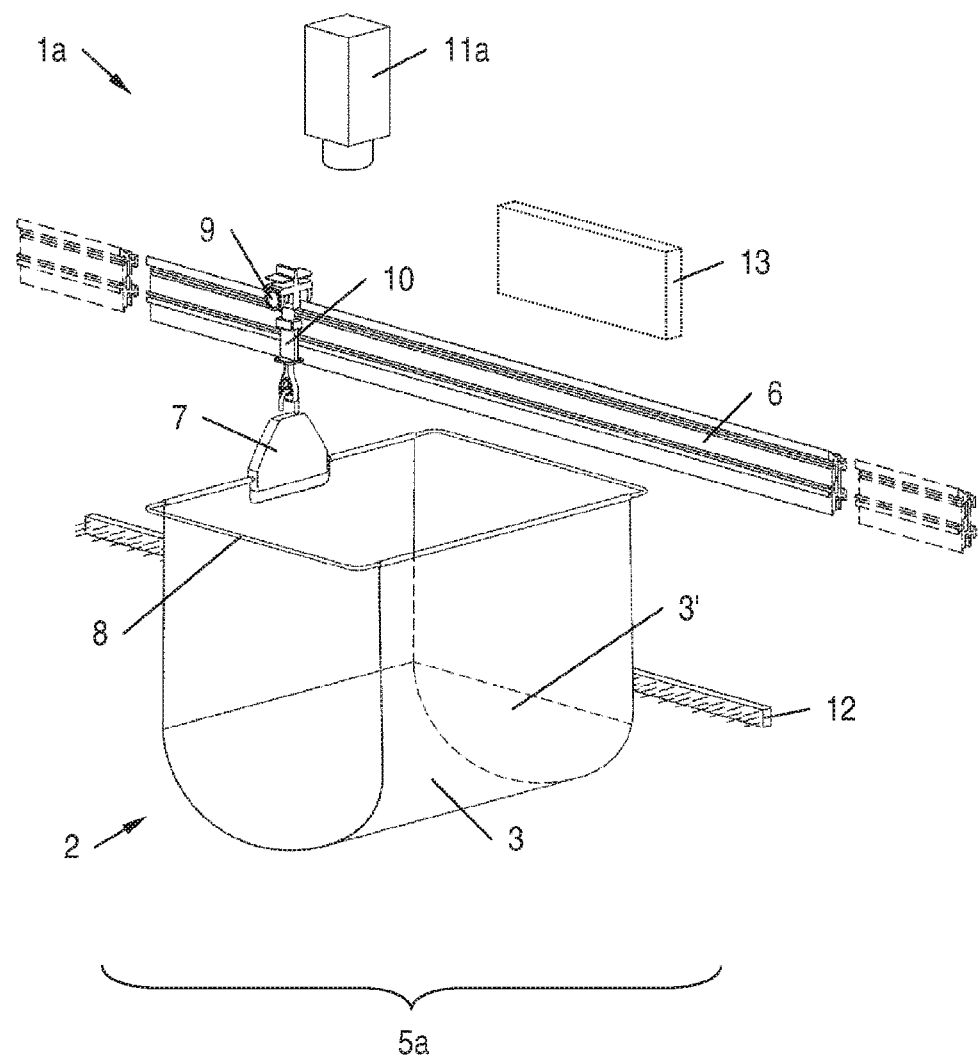
FIG. 1 an exemplary and schematically shown overhead conveyor system and/or a loading station with a camera, a swing-calming device, and a hanging bag in a loading position in an oblique view.
Figure 2:
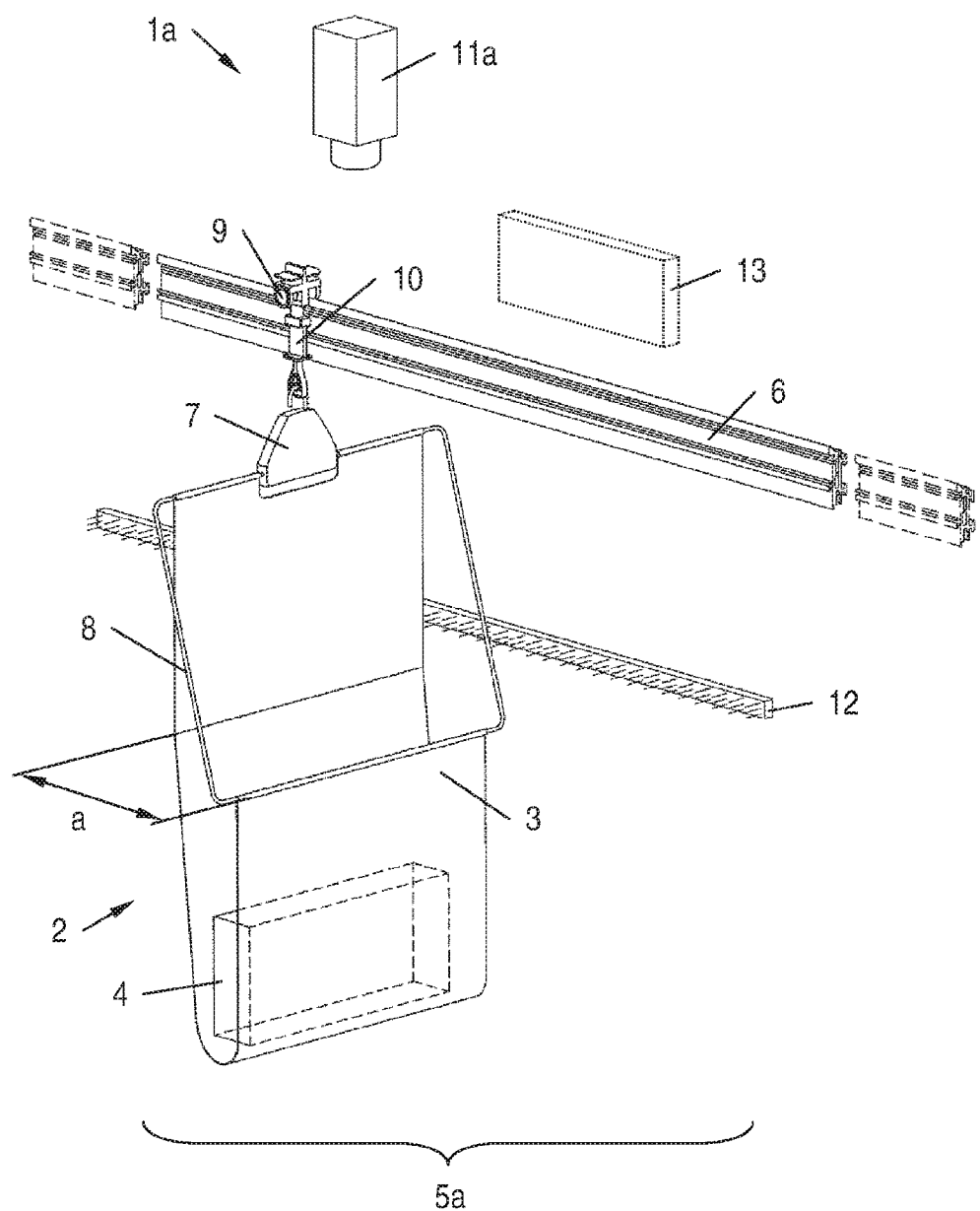
FIG. 2 like FIG. 1 but with the loaded hanging bag in a transport position.

FIGS. 1 and 2 show a first exemplary and schematically shown embodiment of an overhead conveyor system 1a in an oblique view. The overhead conveyor system 1a comprises hanging bags 2, which each have a bag body 3 which is adjustable between a transport position and a loading position and which are made of a non-rigid material (flexible material) and are designed for transporting articles 4. The bag body 3 forms that part of the hanging bag 2 in which the article 4 is received and is usually made of a textile, a plastic film, a mesh or a knitted fabric. FIG. 1 shows the unloaded bag body 3 in the loading position, and FIG. 2 shows the bag body 3 loaded with the article 4 in the transport position.

The overhead conveyor system 1a additionally comprises a loading station 5a, at which a hanging bag 2 may be loaded with an article 4 when the bag body 3 is in the loading position. Moreover, the overhead conveyor system 1a comprises an overhead conveying device 6 for transporting a hanging bag 2 into the loading station 5a and for transporting the hanging bag 3 out of the loading station 5a. In this example, the loading station 5a is formed essentially of a holding region on the overhead conveying device 6, but it may also be constructed in a more complex manner.

In this example, the hanging bag 2 has an optional suspended support 7 for the suspended transport of the hanging bag 2 on the overhead conveying device 6 and a frame 8 by means of which the bag body 3 is suspended on the suspended support 7 and by which the bag body 3 can be adjusted between the transport position and the loading position. Specifically, the suspended support 7 is suspended, in this example, on a transport carrier (carriage) 10 equipped with rollers 9, which is movable by means of a drive device of the overhead conveying device 6. However, a different form of suspension would of course also be conceivable. Different embodiments of drive devices and the of the transport carriers are explained, for example, in the Austrian patent application A50092/2019. The transport carriers can thus be moved on the overhead conveying device 6 by means of a frictional drive or a form-fit drive. By the frame 8, the bag body 3, which is per se non-rigid (flexible), is held in an at least partially predefined shape in both the loading position and the transport position. Hence, on the one hand, the loading operation is facilitated and, on the other hand, a change in the shape of the bag body 3 during transport across the overhead conveying device 6 is less likely.

In the example shown, the bag body 3 forms a rear wall and a front wall. In the loading position of the hanging bag 2 shown in FIG. 1, the rear wall and the front wall of the bag body 3 are spaced apart from one another by such a distance that the hanging bag 2 can be loaded with the article 4. In the transport position of the hanging bag 2 shown in FIG. 2, the rear wall and the front wall are held so as to be approximate to one another in the transport position, so that the loaded hanging bag 2 with the article 4 can be securely transported. In the transport position of the hanging bag 2, the article 4 is held in particular clampingly between the rear wall and the front wall. When the hanging bag 2 is unloaded and/or empty, the rear wall and the front wall abut on one another in the transport position of the hanging bag 2. It is also conceivable that the bag body 2 comprises a loading opening formed on a first side of the bag body 3 at least in some sections between the front and rear wall, and a side wall stop 3' (shown only in FIG. 1) which is formed on a second side of the bag body 3 at least in some sections between the front and rear wall and against which the article 4 can be placed. This side wall stop prevents the article 4 from laterally slipping out of the bag body 3.

Moreover, the overhead conveyor system 1a comprises a measuring device 11a, which is designed to determine an expansion a of the bag body 3 in a transport direction of the loaded hanging bag 2 in the transport position of the bag body 3 (i.e. the thickness of the bag body 3). Specifically, the measuring device 11a is designed as a camera in this example, which camera is arranged above the overhead conveying device 6 and directed downwards. Of course, a different position and/or a different orientation of the camera 11a would also be conceivable.

Lastly, the overhead conveyor system 1a in this example comprises an optional swing-calming device 12 arranged in the movement range of the hanging bag 2 and comprising a broom or brush bar.

Figure 7:
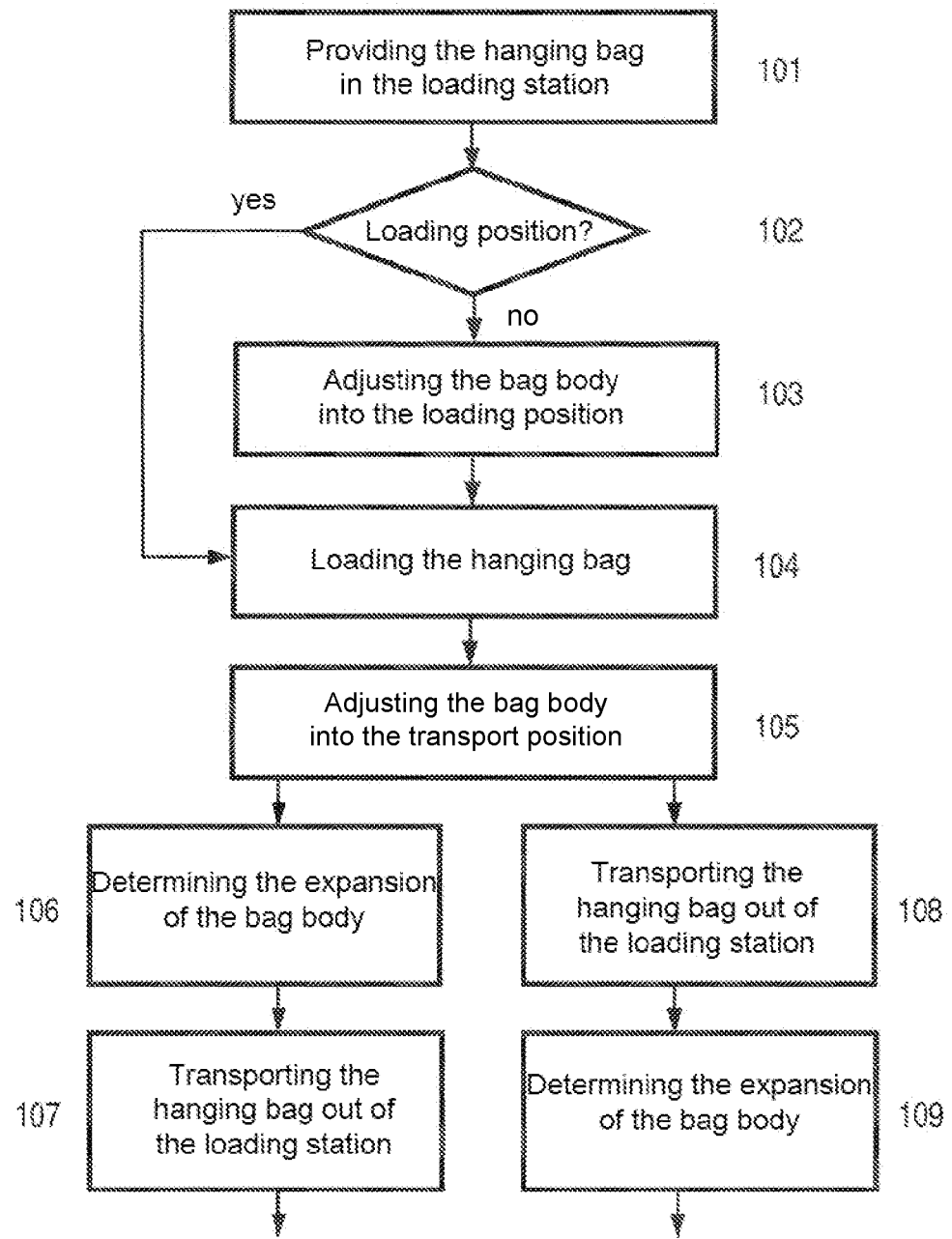

The function of the overhead conveyor system 1a shown in FIGS. 1 and 2 is now explained in further detail with reference to FIG. 7:

In a first step 101, the hanging bag 2 is provided in the loading station 5a. In the example shown in FIGS. 1 and 2, this takes place by the hanging bag 2 being transported into the loading station 5a via the overhead conveying device 6. In an optional step 102, it is checked whether the hanging bag 2 is in the loading position. If this is not the case, the bag body 3 is adjusted into the loading position in a step 103. The explicit checking of the loading position in step 102 may be omitted if, in step 101, the hanging bags 2 are always provided in the loading station 5a in the transport position. In a further step 104, the hanging bag 2 is loaded with the article 4. In a step 105, the bag body 3 is consequently adjusted into the transport position. In a further step 106, the expansion/thickness of the bag body 3 in the transport direction of the loaded hanging bag 2 is determined. Lastly, the hanging bag 2 is transported out of the loading station 5a by use of the overhead conveying device 6 in a step 107. The measurement of the expansion a of the bag body 3 can generally be performed during productive operation or in a separate measurement step, independent of productive operation.

The sequence of steps 106 and 107 applies to the embodiment of the overhead conveyor system 1a shown in FIGS. 1 and 2, according to which the measuring device 11a is arranged in the loading station 5. However, it would also be conceivable that the measuring device 11a is arranged along a conveying section of the overhead conveying device 6 arranged outside the loading station 5a. In this case, the hanging bag 2 would first be transported out of the loading station 5a in a step 108 and be measured in a step 109.

If the measuring device 11a is arranged in the loading station 5a, as shown in FIGS. 1 and 2, the measuring results regarding the expansion a of the bag body 3 are available quickly, namely even before the hanging bag 2 is transported out of the loading station 5a.

Figure 6:
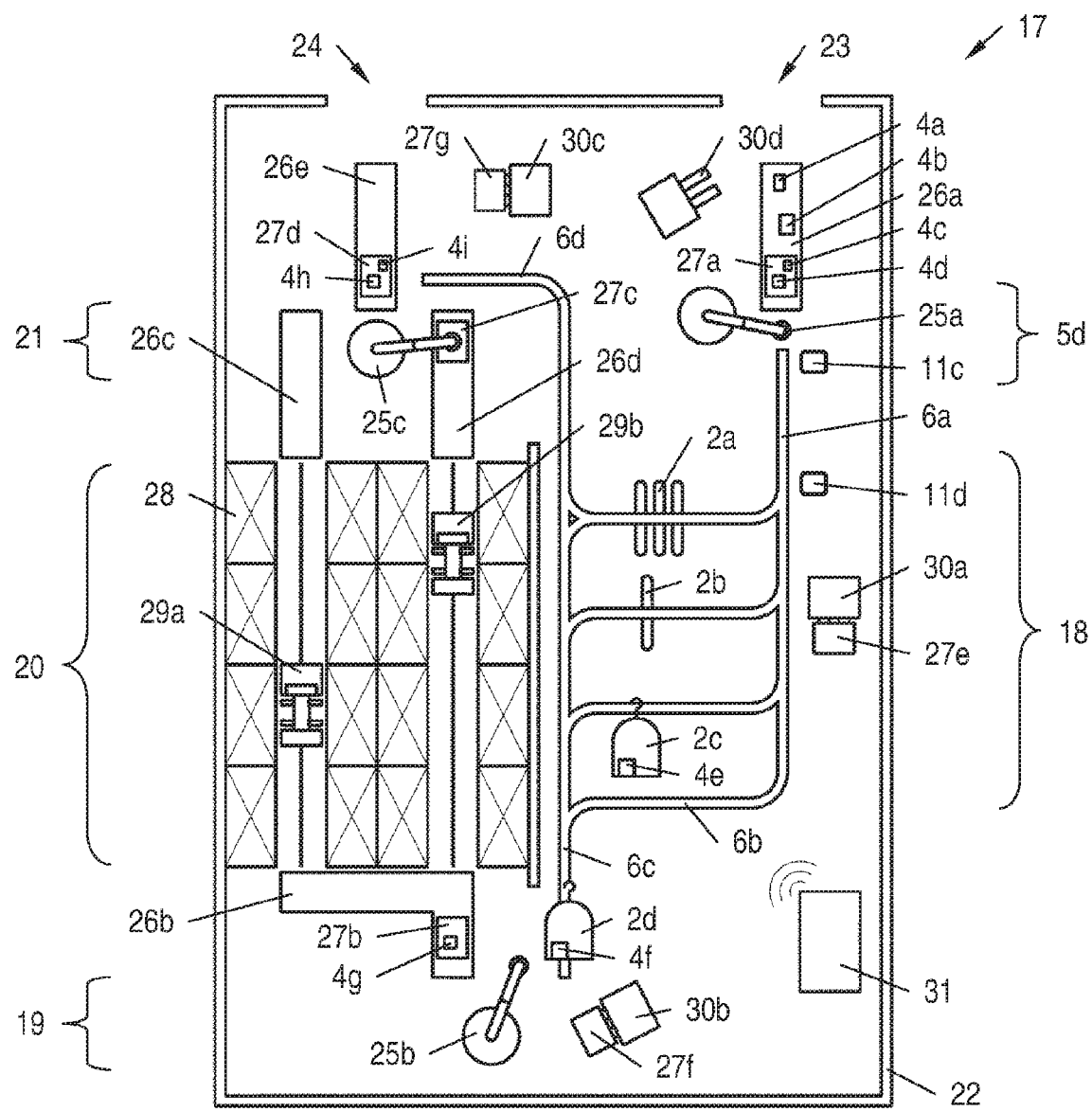
FIG. 6 an exemplary and schematically shown storage and order-picking system in a top view, and FIG. 7 an exemplary flowchart for the loading and measuring of a hanging bag.

If the measuring device 11a is arranged outside the loading station 5a, the measurement results regarding the expansion a of the bag body 3 can be determined at the time they are actually required, for example in front of a warehouse or a buffer (see also FIG. 6). This also takes into account displacements of the article 4 in the hanging bag 2 that occur during transport of the hanging bag 2 on the overhead conveyor device 6 after the loading station 5a.

Of course, multiple measuring devices 11a can be provided along the overhead conveying device 6 in order to be able to determine the expansion/thickness a of the bag body 2 more than once. In particular, measuring devices 11a may be provided both in the loading station 5 and outside the loading station 5. The mentioned measuring devices 11a may be of different designs.

The expansion/thickness a of the bag body 3 may be stored, in a database, assigned to the corresponding hanging bag 2 and/or assigned to a type of the article 4 loaded in the hanging bag 2. Accordingly, in addition to the already existing data such as length, width, thickness, etc., data on the expansion/thickness a of the bag body 3, which is captured after the loading of a hanging bag 2, is linked in terms of data technology for each article 4. It is also possible that the hanging bag 2 is equipped with an identifying means, in particular an RFID transponder. The identifying means can store the data on the expansion/thickness a of the bag body 3, which is captured after the loading of the hanging bag 2. This stored information may be used subsequently for controlling the material flow.

In particular, the determined expansion/thickness a of the bag body 3 may be used for calculating a receiving capacity in a hanging bag storage or in a hanging bag buffer. For example, it may be checked whether a hanging bag 2 with a known thickness a or how many hanging bags 2 with a known thickness a fit onto an overhead conveying device 6 (overhead track) of a hanging bag storage/hanging bag buffer with a known length. In this regard, in particular, a remaining free length of an overhead conveying device 6 may be made reference to when it is partially occupied with hanging bags 2 and possibly hanging articles (see also FIG. 6).

During the loading operation of the hanging bag 2 and during the transport of the same on the overhead conveying device 6, the hanging bag 2 may start swinging, in particular if it is accelerated or decelerated. In this regard, the swing may occur in the transport direction of the hanging bag 2, transversely to the transport direction of the hanging bag 2 or in a general direction. Generally, the measurement of the expansion/thickness a of the bag body 2 may be undesirably influenced by the swinging motion. This is the case particularly when the measurement time is in the order of the cycle duration of the swing of the hanging bag 2.

In order to avoid a swinging motion or to at least quickly reduce it and to simultaneously provide for an alignment of the hanging bag 2, the broom or brush bar 12 is provided in the example shown in FIGS. 1 and 2, which is arranged in the movement range of the hanging bag 2. For this purpose, the broom or brush bar 12 is oriented such that the bristles of the broom or brush bar 12 touch the hanging bag 2, in particular its bag body 3. The broom or brush bar 12 not only offers the aforementioned advantages but also enables a trouble-free transport of the hanging bags 2 in the region of the broom or brush bar 12.

As shown in FIGS. 1 and 2, the broom or brush bar 12 may be arranged in the lateral movement range of the hanging bag 2 (in particular on the side edge of the bag body 3), however, the broom or brush bar 12 may also be arranged in the lower movement range of the hanging bag 2 (in particular on the lower edge of the bag body 3). It is also possible to arrange multiple broom or brush bars 12 in the movement range, in particular both in the lower and the lateral movement range.

In a particularly advantageous embodiment variant of the suggested method, an optical output unit 13 of the loading station 5a, which is designed as a screen in this example, is used to output an instruction to an operator in the loading station 5a or to a loading robot of the loading station 5a, to place the article 4 loaded in the hanging bag 2 differently (in particular in a predefined orientation) in the hanging bag 2 if the determined expansion/thickness a of the bag body 3 exceeds a reference value. In this embodiment variant, it is thus assumed that the article 4 is to be placed in the hanging bag 2 in a predefined orientation. In the case of manual loading, this instruction may take place actively, for example by means of a corresponding depiction on the screen 13 or by having the operator at the loading station 5 be trained accordingly. If the loading takes place automatically, a corresponding instruction may be issued to the loading robot (see FIG. 6). In the case of manual loading, an acoustic instruction delivered via a loudspeaker is of course also conceivable. The output unit 13 then comprises said loudspeaker.

A particular problem when loading hanging bags 2 is based on the fact that the expansion/thickness a does not necessarily correspond to the expected value or reference value, even if the article 4 is placed in the hanging bag 2 correctly, i.e. according to the instruction. The reason for this is that the orientation of the article 4 may change in an unexpected and undesired manner when the hanging bag 2 is closed, that is upon adjustment from the loading position to the transport position, and/or during the transport of the hanging bag 2 on the overhead conveying device 6. However, with the suggested measures, a check and an appropriate correction is possible. The instruction to the operator in the loading station 5a or to the loading robot of the loading station 5a may, in this regard, particularly comprise information as to the orientation in which to place the article 4 in the hanging bag 2, for example in the case of manual loading by using a corresponding depiction on the screen 13 and/or via an acoustic (spoken) instruction. However, it is also conceivable that the mentioned instruction does not contain any such information. This is sufficient, particularly when the desired orientation is already known to the operator in the loading station 5a or the loading robot of the loading station 5a.

It is also particularly advantageous if the output unit 13 of the loading station 5a is used to output an instruction to an operator in the loading station 5a or to a loading robot of the loading station 5a, to place the article 4 loaded in the hanging bag 2 differently (in particular in a predefined orientation) in the hanging bag 2 if a determined orientation of an article 4 placed in the hanging bag 2 deviates from a reference orientation beyond a threshold value. The possibilities suggested for this purpose and the advantages resulting therefrom are equivalent to the aforementioned embodiment variants and advantages. However, the expansion/thickness a of the bag body 3 is not compared to a reference value in order to determine an undesired orientation of the article 4 in the bag body 3, but the orientation of the article 4 is compared directly to a reference orientation, for example with the aid of a camera 11.

In this embodiment variant, it is thus again assumed that the article 4 is to be placed in the hanging bag 2 in a predefined orientation. In the case of manual loading, this instruction may take place actively, for example by means of a corresponding depiction on the optional screen 13 or by having the operator at the loading station 5a be trained accordingly. If the loading takes place automatically, a corresponding instruction may be issued to the loading robot. A particular advantage of the suggested method is that an undesired orientation of the article 4 in the hanging bag 2 can be determined even before the bag body 3 is adjusted into the transport position. If the actual orientation of the article 4 in the hanging bag 2 does not correspond with the expected orientation, the instruction to the operator in the loading station 5 or to the loading robot of the loading station 5 may again particularly comprise information as to the orientation in which to place the article 4 in the hanging bag 2, for example in the case of manual loading by using corresponding depictions (image output) on the screen 13 and/or via an acoustic (spoken) instruction (speech output). However, it is also conceivable that the mentioned instruction does not contain any such information. This is sufficient, particularly when the desired orientation is already known to the operator in the loading station 5a or the loading robot of the loading station 5a.

Figure 3:
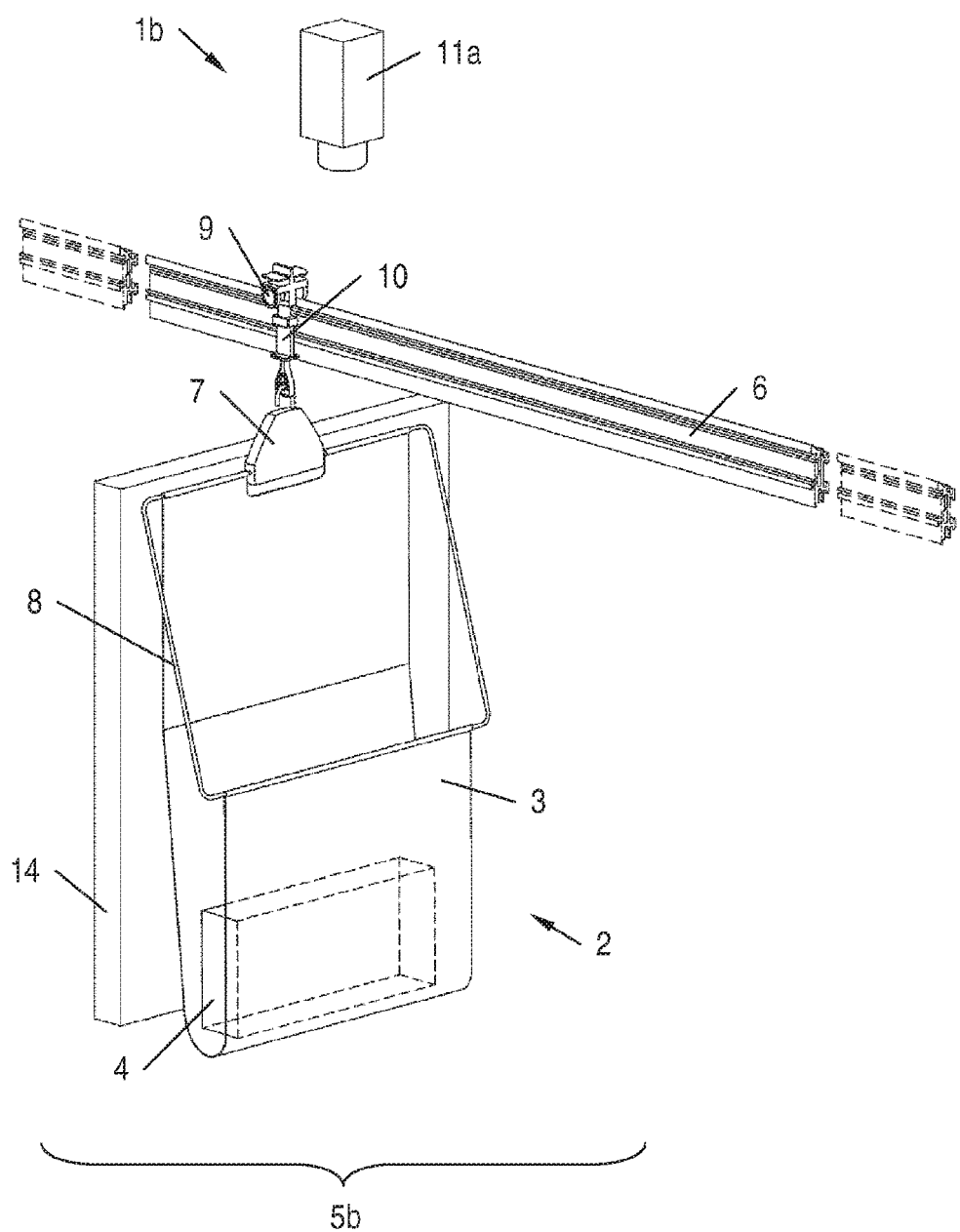
FIG. 3 an exemplary and schematically shown overhead conveyor system and/or a loading station with a camera, a positioning device, and a loaded hanging bag in a transport position in an oblique view.

In the example shown in FIGS. 1 and 2, a swinging motion of the hanging bag 2 is weakened or even prevented by means of a broom or brush bar 12. However, this is not the only conceivable possibility. It is also conceivable that a positioning device 14 arranged in the movement range of the hanging bag 2 is provided, which positioning device 14 comprises a wall aligned transversely (in particular orthogonally) to the transport direction of the hanging bag, as it the case in the example, shown in FIG. 3, of an overhead conveyor system 1b, which is very similar to the overhead conveyor system 1a. With the aid of this wall 14, a swinging motion of the hanging bag 2, which is unfavorable to the determination of the expansion a of the bag body 3, can also be quickly reduced or prevented overall. The measurement of the expansion a of the bag body 3 may thus also be carried out quickly and with a high accuracy. The mentioned wall 14 also, on the one hand, ensures a quick reduction or prevention of a swinging motion; however, on the other hand also in particular ensures an alignment of the hanging bag 2. To prepare the measurement, the hanging bag 2 (in particular its bag body 3) is driven against the wall 14 aligned transversely to the transport direction, whereby the hanging bag 2 assumes the orientation of the mentioned wall 14. The wall 14 may be designed as a fixed wall or as a movable wall. If the wall 14 is movable, it may be pivoted and/or pushed into the movement range of the hanging bags 2 as needed. If the wall 14 is fixed, the transport direction of the hanging bags 2 is changed in order to move them to and from the wall 14. Furthermore, the embodiment variants and advantages mentioned in regard to the overhead conveyor system 1a shown in FIGS. 1 and 2 can also be applied analogously to the overhead conveyor system 1b of FIG. 3.

Figure 4:
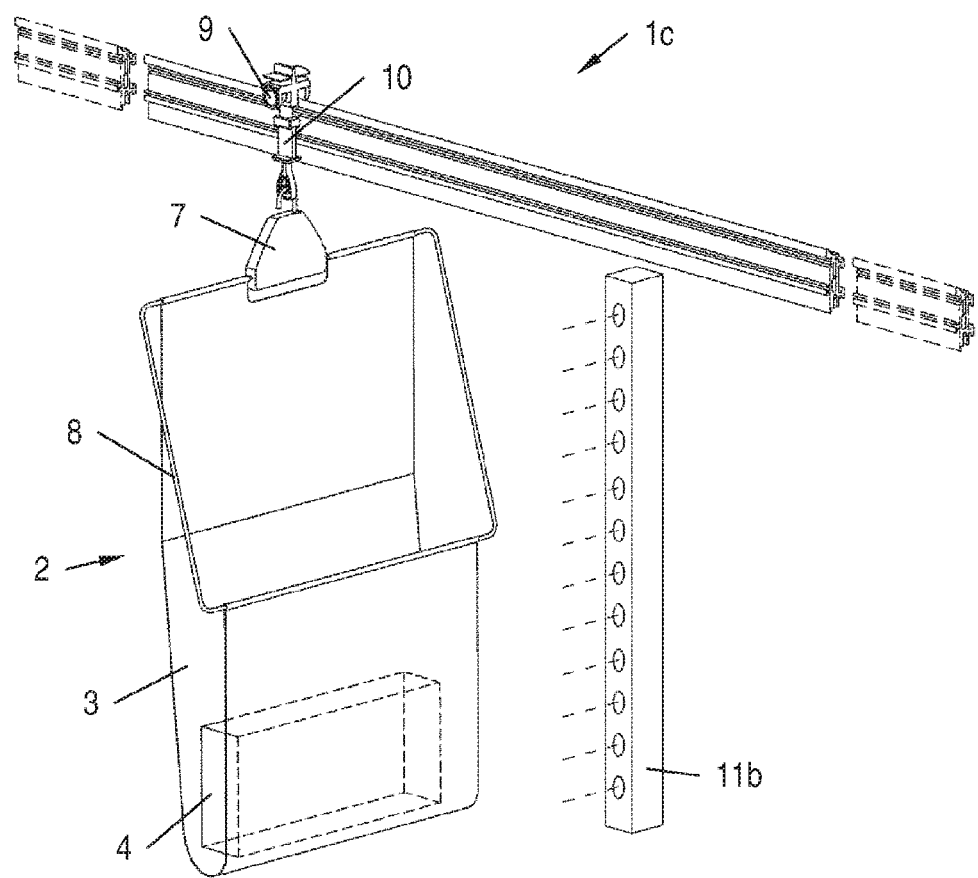
FIG. 4 an exemplary and schematically shown overhead conveyor system with a light grid and a loaded hanging bag in a transport position in an oblique view.

In the example shown in FIGS. 1 and 2, the measuring device is designed as a camera 11a. However, this is not the only conceivable possibility. It is also conceivable that the measuring device is formed as a light grid 11b (which corresponds to an arrangement of multiple light barriers with light rays arranged in a grid), as it is the case in the overhead conveyor system 1c shown in FIG. 4, which is also very similar to the overhead conveyor system 1a. By using a light grid 11b, particularly convex shapes of the bag body 3 can be measured with great accuracy. An advantage of the camera 11a, however, is that it not only allows determining the expansion a of the bag body 3 but also detecting other properties. For example, using the camera 11a, an article type of the article 4 loaded in the hanging bag 2, the number of articles 4 loaded in the hanging bag 2, and the orientation of the article 4 loaded in the hanging bag 2 can be determined. Furthermore, the embodiment variants and advantages mentioned in regard to the overhead conveyor system 1a shown in FIGS. 1 and 2 and in regard to the overhead conveyor system 1b shown in FIG. 3 can also be applied analogously to the overhead conveyor system 1c of FIG. 4.

It is generally conceivable that the expansion a of the bag body 3 is measured while the hanging bag 2 is transported on the overhead conveying device 6 (meaning that the measuring takes place in motion). This type of measurement is particularly suitable for static measuring devices with a narrow detection area, as it is the case with the light grid 11b of FIG. 4.

However, it is also conceivable that the expansion a of the bag body 3 is measured during a standstill of the hanging bag 2. Thereby, the result is independent of the time needed for measuring. This embodiment variant is particularly suitable for the application in combination with a camera 11a, which acts as the measuring device. However, the expansion a of the bag body 3 can generally also be measured, by means of the camera 11a, during the transport movement of the hanging bag 2.

Figure 5:
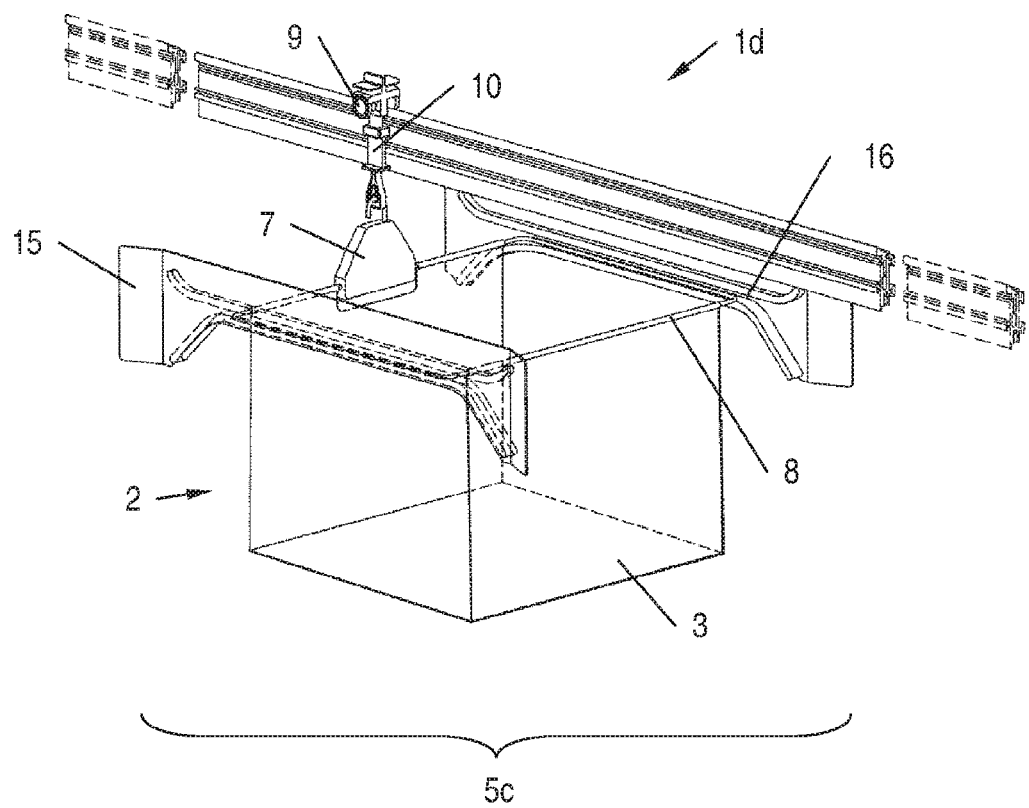
FIG. 5 an exemplary and schematically shown overhead conveyor system and/or a loading station with a hanging bag actuation device and a hanging bag in a loading station in an oblique view.

FIG. 5 shows an overhead conveyor system 1d with a loading station 5c, which comprises an actuation device 15, by means of which the bag body 3 can be adjusted from the transport position into the loading position and from the loading position to the transport position. Hence, the loading operation may be partially or entirely automated. For the adjustment operation, the frame 8 of the hanging bag 2 glides along a guide track 16 of the actuation device 15, whereby the adjustment out of the transport position into the loading position and vice versa is effected. In this regard, FIG. 5 shows the bag body 3 in the loading position.

In the actuation device 15, the adjustment between transport position and loading position takes place during the movement of the hanging bag 2. However, it is also conceivable that the hanging bag 2 is stopped in a loading location and subsequently, the bag body 3 is adjusted from the transport position into the loading position (i.e. opened), or from the loading position into the transport position (i.e. Closed) by means of a different actuation device, for example by means of a swivel frame or a loading robot.

Although the adjustment of the bag body 3 between the transport position and the loading position preferably takes place automatically, it may also be performed manually. For example, the frame 8 of a hanging bag 2 provided in the loading station 5a . . . 5c may be pivoted manually, so that the bag body 3 is adjusted out of the transport position into the loading position, or from the loading position into the transport position.

In the examples disclosed thus far, the bag body 3 is suspended with its ends on a (single) transport carrier 10 on an overhead conveying device 6. However, it is also conceivable that the bag body 3 is suspended with its ends on two transport carriers 10 on an overhead conveying device 6 (not shown). In this case, an adjustment from the transport position into the loading position is possible, for example, by increasing the distance between the two transport carriers 10. For the adjustment from the loading position into the transport position, the distance between the two transport carriers 10 is, in turn, correspondingly reduced.

At this point, it should be noted that the variants disclosed above for adjusting the bag body between the loading position and the transport position can be applied as desired with the overhead conveyor systems 1a . . . 1c of FIGS. 1 to 4. The features of the overhead conveyor systems 1a . . . 1c of FIGS. 1 to 4 can also be combined with one another as desired.

FIG. 6 shows a schematic representation of an exemplary storage and order-picking system 17 in a top view.

Specifically, a loading station 5d, a hanging bag storage 18, a reloading station 19 (induct station), a storage for flat-packed articles 20, and a picking station 21 are accommodated in a building 22. The building 22 moreover has two building openings 23 and 24, which may act as goods-in point and/or goods-out point.

The loading station 5d may comprise a first robot 25a, a first supply position on a conveyor track for flat-packed articles 26a, and a second supply position on an overhead conveying device 6a. By way of example, multiple articles 4a . . . 4d are arranged on the conveyor track for flat-packed articles 26a. In this regard, the articles 4c and 4d lie in a loading aid for flat-packed articles 27a, the articles 4a and 4b lie loose (meaning without a loading aid for flat-packed articles 27a) on the conveyor track for flat-packed articles 26a. The conveyor track for flat-packed articles 26a leads from the building opening 23 to the first robot 25a, and the overhead conveying device 6a leads from the first robot 25a to the hanging bag storage 18, which comprises multiple overhead conveying devices 6b. The loading station 5d is therefore connected, in respect of a conveying stream, to the hanging bag storage 18 via the overhead conveying device 6a of the overhead conveyor system of the storage and order-picking system 17.

In the region of the loading station 5d, a first measuring device 11c is arranged, and outside the loading station 5d, directly before the overhead conveying devices 6b of the hanging bag storage 18, an optional second measuring device 11d is located. The two measuring devices 11c and 11d may be designed, for example as a camera or a light grid.

Some hanging bags 2a . . . 2c are shown, by way of example, on the overhead conveying devices 6b of the hanging bag storage 18, which mainly serve storage but also transport. In this regard, the hanging bag 2c is drawn rotated by 90° into the drawing plane to be able to show the article 4e stored therein. Of course, in reality, the hanging bag 2c hangs downward like the hanging bag 2a, 2b. An overhead conveying device 6c leads from the hanging bag storage 18 to the reloading station 19. The reloading station 19 may comprise a second robot 25b, a first supply position on the overhead conveying device 6c, and a second supply position on a conveyor track for flat-packed articles 26b, wherein the latter leads from the second robot 25b of the reloading station 19 to the storage for flat-packed articles 20.

In the example shown, a hanging bag 2d with an article 4f stored therein is situated at the first supply position of the reloading station 19. Like the hanging bag 2c, the hanging bag 2d is also drawn rotated into the drawing plane for better depictability. In the example shown, a loading aid for flat-packed articles 27b with an article 4g stored therein is situated at the second supply position of the reloading station 19.

In this example, the storage for flat-packed articles 20 comprises multiple storage racks 28, each with multiple storage places, as well as storage and retrieval devices 29a and 29b, which travel in the rack aisles extending between the storage racks 28. On the upper end of the rack aisles, two conveyor track for flat-packed articles 26c, 26d are arranged, which lead from the storage for flat-packed articles 20 to the picking station 21.

The picking station 21 may comprise a third robot 25c, a first supply position on the conveyor track for flat-packed articles 26c, a second supply position on the conveyor track for flat-packed articles 26d, and a third supply position on a conveyor track for flat-packed articles 26e, wherein the latter connects the third robot 25c to the building opening 24.

Moreover, FIG. 6 also shows an overhead conveying device 6d, which connects the hanging bag storage 18 to the picking station 21.

In this example, a loading aid for flat-packed articles 27c is located at the second supply position on the conveyor track for flat-packed articles 26d, and, in this example, a loading aid for flat-packed articles 27d with two articles 4h, 4i stored therein is located at the third supply position on the conveyor track for flat-packed articles 26e.

Moreover, multiple autonomous mobile robots 30a . . . 30d with loading aid for flat-packed articles 27a . . . 27g transported thereon are present in the storage and order-picking system 17 shown in FIG. 6. Specifically, in this regard, the autonomous mobile robots 30a and 30b are situated between the loading station 5d and the reloading station 19, and the autonomous mobile robots 30c and 30d are situated between the loading station 5d and the picking station 21.

In addition or as an alternative to the hanging bags 4a . . . 4c shown, hanging articles (without hanging bags) may also be transported on the overhead conveying devices 6a . . . 6d of the storage and order-picking system 17 shown in FIG. 6. Hence, the hanging bag storage may also assume the function of a hanging article storage.

The functioning of the storage and order-picking system 17 depicted in FIG. 6 is as follows:

Articles 4a . . . 4i can be delivered via the building openings 23 and 24 and be stored in the hanging bag storage 18 or in the storage for flat-packed articles 20. However, articles 4a . . . 4i may also be retrieved from the hanging bag storage 18 or from the storage for flat-packed articles 20 and be transported away via the building openings 23 and 24.

The conveyor track for flat-packed articles 26a . . . 26e and the overhead conveying devices 6a . . . 6d, the storage and retrieval devices 29a, 29b and the autonomous mobile robots 30a . . . 30d, in this regard, serve the transport of the articles 4a . . . 4i within the storage and order-picking system 17. The robots 25a . . . 25c serve the transfer of articles 4a . . . 4i between the different conveyor track for flat-packed articles 26a . . . 26e and overhead conveying devices 6a . . . 6d. With the aid of an illustrative example, the operations in the storage and order-picking system 17 are examined further.

For example, articles 4a . . . 4d can be provided at the building opening 23 of the storage and order-picking system 17, discharged onto the conveyor track for flat-packed articles 26a, and supplied at the first supply position of the loading station 5d. At the second supply position of the loading station 5d, an (empty) hanging bag 2a . . . 2d is supplied. Subsequently, the articles 4a . . . 4d are collected by the first robot 25a from the conveyor track for flat-packed articles 26a or from the loading aid for flat-packed articles 27a and are loaded into the supplied hanging bag 2a . . . 2d.

Following this, the expansion/thickness a of the bag body 3 in a loaded hanging bag 2a . . . 2d is determined with the aid of the first measuring device 11c. In this process, the measures disclosed in connection with FIGS. 1 to 5 and 7 can be taken. In particular, the expansion a of the bag body 3 can be compared to a reference value, an orientation of an article 4a . . . 4d placed into the hanging bag 2a . . . 2d can be compared to a reference orientation and/or stored in a database, assigned to the corresponding hanging bag 2a . . . 2d and/or assigned to a type of the article 4a . . . 4d loaded in the hanging bag 2a . . . 2d.

With the aid of the optional second measuring device 11d, the expansion/thickness a of the bag body 3 of the loaded hanging bags 2a . . . 2d can be determined once more, in order to take into account shifts of the article 4a . . . 4d during the transport of the hanging bags 2a . . . 2d via the overhead conveying device 6a. In particular, the determined expansion a of the bag body 3 may be used for calculating a receiving capacity in the hanging bag storage 18. For example, it can be checked whether a hanging bag 2a . . . 2d or how many hanging bags 2a . . . 2d can be received on an overhead conveying device 6b in the hanging bag storage 18. In this regard, in particular, a remaining free length of an overhead conveying device 6b may be made reference to when it is already partially occupied with hanging bags 2a . . . 2d, as it is the case in FIG. 6. Subsequently, the loaded hanging bags 2a . . . 2d are transported into the hanging bag storage 18. In other words, the available buffer capacity on the overhead conveying device 6b and/or in the hanging bag storage 18 may be used optimally, and a maximum number of filled hanging bags 2a . . . 2d may be received on the respective overhead conveying device 6b.

In a further step, the articles 4a . . . 4f contained in the hanging bags 2a . . . 2d are transferred by the second robot 25b of the reloading station 19 from the hanging bags 2a . . . 2d into a loading aid for flat-packed articles 27b. For this purpose, a loaded hanging bag 2a . . . 2d is supplied at the first supply position of the reloading station 19, and a loading aid for flat-packed articles 27b is supplied at the second supply position of the reloading station 19. Subsequently, the loading aid for flat-packed articles 27b is stored, with the transferred articles 4a . . . 4f, in the storage for flat-packed articles 20. For this purpose, the loading aid for flat-packed articles 27b is transported by the conveyor track for flat-packed articles 26b to one of the two storage and retrieval devices 29a, 29b, taken over by it and stored in the storage rack 28.

When a picking order for picking articles 4a . . . 4g is detected, a loading aid for flat-packed articles 27b which contains articles 4a . . . 4g assigned to the picking order is retrieved from the storage rack 28 by means of one of the two storage and retrieval devices 29a, 29b and is transferred onto the corresponding conveyor track for flat-packed articles 26c, 26d. With the aid of the conveyor track for flat-packed articles 26c, 26d, the article 4a . . . 4g is transported to the first or second supply position of the picking station 21 and supplied there. At the third supply position of the picking station 21, a loading aid for flat-packed articles 27c is supplied. Subsequently, the articles 4a . . . 4g assigned to the picking order are loaded from the loading aid for flat-packed articles 27b into the loading aid for flat-packed articles 27c by the third robot 25c. Alternatively or additionally, of course, it is also possible that an article 4a . . . 4g originating from the hanging bag storage 18 is transported to the picking station 21 via the overhead conveying device 6d, is supplied there and is subsequently loaded into the loading aid for flat-packed articles 27c by the third robot 25c.

Lastly, in a further step, the articles 4a . . . 4i are dispatched by the loaded loading aid for flat-packed articles 27c being conveyed to the building opening 23 by the conveyor track for flat-packed articles 26e and being transported away from there.

At this point, it should again be noted that the example described above is merely illustrative and there are many further possibilities of how the articles 4a . . . 4i can be handled in the storage and order-picking system 17.

In general, the processes in the storage and order-picking system 17 are controlled by a central control system 31. In the example shown, a radio link to the conveying devices of the storage and order-picking system 17 is indicated, but of course a wired communication is also possible. Specific exemplary embodiment for such a central control system 31 are a material flow computer known per se or a warehouse management system known per se.

In the example shown in FIG. 6, the overhead conveying device 6a . . . 6d is designed as a stationary overhead conveying device. However, it is also conceivable that the hanging bags 2a . . . 2d are transported by the autonomous mobile robots 30a . . . 30d such that the overhead conveying device is additionally or alternatively designed as a mobile overhead conveying device. For conveying the hanging bags 2a . . . 2d, the autonomous mobile robots 30a . . . 30d can, for example, comprise suspension rods.

The robots 25a . . . 25c are formed by a jointed-arm robot in the example shown in FIG. 6. However, it would also be conceivable that a part of the robots 25a . . . 25c or all robots 25a . . . 25c are formed by gantry robots.

The adjustment of the bag body 3 from the loading position into the transport position or from the transport position into the loading position may in general be carried out manually or automatically. If it is carried out automatically, the robots 25a . . . 25c may be used for this purpose. However, it is also conceivable that an actuation device 15 of the type of the actuation device 15 shown in FIG. 5 is arranged in the loading station 5d.

By the suggested measures, it is possible to perform the algorithms running in an overhead conveyor system 1a . . . 1d and/or in the storage and order-picking system 17 based on the actual dimensions of a hanging bag 2, 2a . . . 2d instead of reverting to assumed dimensions which usually do not correspond with the facts. The planning in an overhead conveyor system 1a . . . 1d/storage and order-picking system 17 may thus be performed more precisely, and the likelihood of malfunctions may hence be reduced significantly.

It should finally be noted that the scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

In particular, it should also be noted that the devices shown may in reality comprise more or fewer components than those shown. In some cases, the shown devices and/or their components may not be depicted to scale and/or be enlarged and/or reduced in size.

LIST OF REFERENCE NUMBERS

1a . . . 1d Overhead conveyor system
2, 2a . . . 2d Hanging bag
3 Bag body
3' Side wall stop of the bag body
4, 4a . . . 4i Article(s)
5a . . . 5d Loading station
6, 6a . . . 6d Overhead conveying device
7 Suspended support
8 Frame
9 Roller
10 Transport carrier (carriage)
11a . . . 11d Measuring device
12 Swing-calming device (broom or brush bar)
13 Output unit (screen)
14 Positioning device (wall)
15 Actuation device
16 Guide track
17 Storage and order-picking system
18 Hanging bag storage
19 Reloading station
20 Storage for flat-packed articles
21 Picking station
22 Building
23 Building opening
24 Building opening
25a . . . 25c Robot
26a . . . 26e Conveyor track for flat-packed articles
27a . . . 27g Loading aid for flat-packed articles
28 Storage rack
29a, 29b Storage and retrieval device
30, 30a . . . 30d Autonomous mobile robot
31 Central control system of the storage and order-picking system
a Expansion/thickness of the bag body

The invention claimed is:
1. An overhead conveyor system (1a . . . 1d) comprising hanging bags (2, 2a . . . 2d), which each comprise a bag body (3) adjustable between a transport position and a loading position and made of a non-rigid material, and which are designed for transporting articles (4, 4a ... 4i), a loading station (5a ... 5d), at which a hanging bag (2, 2a ... 2d) may be loaded with an article (4, 4a ... 4i) when the bag body (3) is in the loading position, an overhead conveying device (6, 6a ... 6d) for transporting a hanging bag (2, 2a ... 2d) into the loading station (5a ... 5d) and for transporting the hanging bag (2, 2a ... 2d) out of the loading station (5a ... 5d), and a measuring device (11a ... 11d), which is designed to determine an expansion (a) of the bag body (3) in a transport direction of the loaded hanging bag (2, 2a ... 2d) in the transport position of the bag body (3).

2. The overhead conveyor system (1a ... 1d) according to claim 1, wherein the measuring device (11a ... 11d) is arranged in the loading station (5a ... 5d).

3. The overhead conveyor system (1a ... 1d) according to claim 1, wherein the measuring device (11a ... 11d) is arranged along a conveying section of the overhead conveying device (6, 6a ... 6d) arranged outside the loading station (5a ... 5d).

4. The overhead conveyor system (1a ... 1d) according to claim 1, wherein the loading station (5a ... 5d) comprises an actuation device (15), by means of which the bag body (3) can be adjusted from the transport position into the loading position and from the loading position to the transport position.

5. The overhead conveyor system (1a ... 1d) according to claim 1, wherein the hanging bag (2, 2a ... 2d) comprises a suspended support (7) for the suspended transport of the hanging bag (2, 2a ... 2d) on the overhead conveying device (6, 6a ... 6d), and a frame (8), by means of which the bag body (3) is suspended on the suspended support (7) and by which the bag body (3) can be adjusted between the transport position and the loading position.

6. The overhead conveyor system (1a ... 1d) according to claim 1, wherein the overhead conveying device (6, 6a ... 6d) comprises transport carriers (10) for transporting the hanging bags (2, 2a ... 2d) into the loading station (5a ... 5d) and for transporting the hanging bags (2, 2a ... 2d) out of the loading station (5a ... 5d), which transport carriers (10) are movable by means of a drive device and on which the hanging bags (2, 2a ... 2d) are suspended via the suspended support (7).

7. The overhead conveyor system (1a ... 1d) according to claim 1, wherein additionally, a swing-calming device (12), which comprises a broom or brush bar and is arranged in the movement range of the hanging bag (2, 2a ... 2d), is provided.

8. The overhead conveyor system (1a ... 1d) according to claim 1, wherein additionally, a positioning device (14) is provided, which is arranged in the movement range of the hanging bag (2, 2a ... 2d) and which comprises a wall aligned transversely to the transport direction of the hanging bag (2, 2a ... 2d).

9. The overhead conveyor system (1a ... 1d) according to claim 1, wherein the measuring device (11a ... 11d) is designed as a camera or a light grid.

10. A storage and order-picking system (17), comprising the overhead conveyor system (1a ... 1d) according to claim 1, and a hanging bag storage (18), which is connected, in respect of a conveying stream, to the loading station (5a ... 5d) via the overhead conveying device (6, 6a ... 6d).

11. A method for determining an expansion (a) of a bag body (3) of a hanging bag (2, 2a ... 2d) of an overhead conveyor system (1a ... 1d), comprising the steps providing (101) the hanging bag (2, 2a ... 2d) on an overhead conveying device (6, 6a ... 6d), which is comprised by the overhead conveyor system (1a ... 1d), adjusting (103) the bag body (3) into a loading position, loading (104) the hanging bag (2, 2a ... 2d) with an article (4, 4a ... 4i), and after loading, adjusting (105) the bag body (3) into a transport position, wherein the expansion (a) of the bag body (3) in a transport direction of the loaded hanging bag (2, 2a ... 2d) is determined in the transport position of the bag body (3) with the aid of a measuring device (11a ... 11d).

12. The method according to claim 11, wherein the expansion (a) of the bag body (3) is measured during a standstill of the hanging bag (2, 2a ... 2d).

13. The method according to claim 11, wherein the expansion (a) of the bag body (3) is measured while the hanging bag (2, 2a ... 2d) is transported on the overhead conveying device (6, 6a ... 6d).

14. The method according to claim 11, wherein an output unit (13) of the loading station (5a ... 5d) is used to output an instruction to an operator in the loading station (5a ... 5d) or to a loading robot (25a ... 25c) of the loading station (5a ... 5d), to place the article (4, 4a ... 4i) loaded in the hanging bag (2, 2a ... 2d) differently in the hanging bag (2, 2a ... 2d) if the determined expansion (a) of the bag body (3) exceeds a reference value.

15. The method according to claim 11, wherein an output unit (13) of the loading station (5a ... 5d) is used to output an instruction to an operator in the loading station (5a ... 5d) or to a loading robot (25a ... 25c) of the loading station (5a ... 5d), to place the article (4, 4a ... 4i) loaded in the hanging bag (2, 2a ... 2d) differently in the hanging bag (2, 2a ... 2d) if a determined orientation of an article (4, 4a ... 4i) placed into the hanging bag (2, 2a ... 2d) deviates from a reference orientation beyond a threshold value.

16. The method according to claim 11, wherein a determined expansion (a) of the bag body (3) is stored in a database, assigned to the corresponding hanging bag (2, 2a ... 2d) and/or assigned to a type of the article (4, 4a ... 4i) loaded in the hanging bag (2, 2a ... 2d).

17. The method according to claim 11, wherein a determined expansion (a) of the bag body (3) is used for calculating a receiving capacity in a hanging bag storage (18) or in a hanging bag buffer.

* * * * *